United States Patent

Tanaka

Patent Number: 5,251,258
Date of Patent: Oct. 5, 1993

[54] KEY DISTRIBUTION SYSTEM FOR DISTRIBUTING A CIPHER KEY BETWEEN TWO SUBSYSTEMS BY ONE-WAY COMMUNICATION

[75] Inventor: Kazue Tanaka, Tokyo, Japan
[73] Assignee: NEC Corporation, Tokyo, Japan
[21] Appl. No.: 843,275
[22] Filed: Feb. 28, 1992

[30] Foreign Application Priority Data

Mar. 5, 1991 [JP] Japan .................................. 3-119544

[51] Int. Cl.$^5$ ............................................. H04L 9/02
[52] U.S. Cl. ........................................ 380/21; 380/30; 380/44
[58] Field of Search ................. 380/21, 30, 43, 44, 380/46

[56] References Cited

U.S. PATENT DOCUMENTS

| | | | |
|---|---|---|---|
| 4,200,770 | 4/1980 | Hellman et al. | |
| 4,876,716 | 10/1989 | Okamoto | |
| 4,908,861 | 3/1990 | Brachtl et al. | 380/30 X |
| 4,956,863 | 9/1990 | Goss | 380/30 |
| 5,029,208 | 7/1991 | Tanaka | 380/21 |
| 5,124,117 | 6/1992 | Tatebayashi et al. | 380/21 |
| 5,142,578 | 8/1992 | Matyas et al. | 380/21 |
| 5,144,665 | 9/1992 | Takaragi et al. | 380/30 X |

OTHER PUBLICATIONS

Diffie et al., "New Directions in Cryptography" IEEE Transactions on Information Theory, vol. IT-22, No. 6, (1976), pp. 644–654.
E. Okamoto, "Key Distribution Systems Based on Identification Information", Advances in Cryptology--CRIPTO '87, (1987) pp. 194–202.

Primary Examiner—Tod R. Swann
Attorney, Agent, or Firm—Foley & Lardner

[57] ABSTRACT

In a key distribution system comprising a first subsystem (11), a second subsystem (12), and a public file (13), the first subsystem transmits distribution information ($ID_A$, $Y_A$) to the second subsystem via a communication channel (16). The first subsystem (11) comprises a reading unit (22) for accessing the public file by reception identification information ($ID_B$) inputted from an input unit (21) to read reception public information ($X_B$). A first cipher key generator (28) generates a first cipher key ($K_A$) by applying a first predetermined transformation on the reception public information and the reception identification information on the basis of first and second constants (n, t), and a random number (r). A distribution code generator (29) generates a key distribution code ($Y_A$) by applying a second predetermined transformation on transmission public information ($X_A$) and a third constant ($a$) on the basis of the first constant, first secret information ($r_A$), and the random number. The second subsystem comprises a second cipher key generator (35) for generating a second cipher key ($K_B$) by applying a third predetermined transformation on the key distribution code and the transmission identification information on the basis of the first and the second constants and second secret information ($r_B$). The second cipher key coincides with the first cipher key.

4 Claims, 3 Drawing Sheets

KEY DISTRIBUTION SYSTEM FOR DISTRIBUTING A CIPHER KEY BETWEEN TWO SUBSYSTEMS BY ONE-WAY COMMUNICATION

BACKGROUND OF THE INVENTION

This invention relates to a key distribution system for distributing a cipher key between two subsystems via a communication channel by one-way communication.

Various key distribution systems are already known. By way of example, a key distribution system is disclosed in a paper which is contributed by W. Diffie and M. E. Hellman to the IEEE Transactions on Information Theory, Vol. IT-22, No. 6, pages 644–654, November issue, 1976, under the title of "New Directions in Cryptography". The key distribution system according to the Diffie et al paper is called the Diffie-Hellman public key distribution system. The Diffie-Hellman public key distribution system comprises a public file or directory in which public information for each of users or conversers is stored. It will be assumed that two conversers are named A and B. Let p be a large prime number of about 256 bits in binary representation, which is publicly known. Let $\alpha$ be a fixed primitive element of the finite field GP(p), i.e. an integer such that its successive powers modulo p ($\alpha$, $\alpha^2$(mod p), $\alpha^3$(mod p), ... ) fill the finite field GP(p) except zero, where a (mod b) means a remainder of division of the number a by the number b. The public file stores public information $Y_A$ of the converser A and public information $Y_B$ of the converser B. The public information $Y_A$ and $Y_B$ are selected so as to be equal to $\alpha^{X_A}$ (mod p) and $\alpha^{X_B}$ (mod p), respectively, where $X_A$ and $X_B$ represent secret numbers of the conversers A and B that are chosen uniformly from the set of integers $\{1, 2, \ldots, (p-1)\}$. Before the converser A sends enciphered messages to the converser B, the converser A prepares an enciphering key $K_A$ generated from the public information $Y_B$ and the secret information $X_A$. The enciphering key $K_A$ represents a number obtained by calculating $Y_B^{X_A}$ (mod p). The converser B also prepares an enciphering key $K_B$ in accordance to $Y_A^{X_B}$ (mod p) in a similar manner. Inasmuch as the enciphering keys $K_A$ and $K_B$ are equal to each other, they will therefore be their common cipher key.

However, the Diffie-Hellman public key distribution system is disadvantageous in that a third party or an eavesdropper may possibly impersonate one of the conversers A and B by doctoring or tampering with the public information.

Another key distribution system is disclosed in U.S. Pat. No. 4,876,716 issued to Eiji Okamoto. The key distribution system according to Okamoto's U.S. Patent is referred to as an identity-based key distribution system. This is because a cipher key is generated by using each converser's identification information instead of the public file used in the Diffie-Hellman public key distribution system. The identification information may be any information such as a converser's name and address. There is no fear that tampering with the public information will occur. This is because the identification information is used as the public information.

The identity based key distribution system comprises a first subsystem, a second subsystem, and an insecure communication channel such as a telephone line which connects the first subsystem with the second subsystem. It is assumed that the first and the second subsystems are used by users or conversers A and B, respectively. Let n be a modulus of size at least 512 bits which is a product of two sufficiently large prime numbers p and q, let e and d be two exponents such that $exd = 1$ (mod $(p-1) \times (q-1)$). Let $\alpha$ be an integer which is both a primitive element in the finite fields GP(p) and GP(q). It will also be assumed that conversers A and B are assigned with identification information $ID_A$ and $ID_B$, respectively. In this event, the conversers A and B have or know secret integer numbers $S_A$ and $S_B$ which are defined as numbers obtainable from $ID_A^d$ (mod n) and $ID_B$ (mod n), respectively.

When the conversers A and B wish to obtain a work or session cipher key K, i.e. a key which is randomly chosen at each communication, the first subsystem of the converser A generates a random number $\gamma$ and sends the second subsystem of the converser B a first key distribution code $X_A$ representative of a number obtained by computing $S_A \alpha^\gamma$ (mod n). The second subsystem of the converser B also generates a random number t and sends the first subsystem of the converser A a second distribution code $X_B$ representative of a number obtained by calculating $S_B \alpha^t$ (mod n). Then, the first subsystem of the converser A calculates $(X_B^e/ID_B)^\gamma$ (mod n) and keeps the resulting number as the work cipher key K. Similarly, the second subsystem of the converser B calculates $(X_A^e/ID_A)^t$ (mod n) and the resulting number as the work cipher key K.

As described above, the identity-based key distribution system must carry out mutual or two-way communication between the first and the second subsystems in order to distribute or exchange the work cipher key K. As a result, the identity-based key distribution system is defective in that communication overhead increases in a known electronic mail system which can transmit messages enciphered with the work cipher key K via the insecure communication channel.

SUMMARY OF THE INVENTION

It is therefore an object of this invention to provide a key distribution system and a method of distributing a cipher key between two subsystems, wherein it is possible to distribute the cipher key between these two subsystems by one-way communication.

It is another object of this invention to provide a key distribution system and a method of distributing a cipher key between two subsystems, wherein it is possible to easily manage secret information.

It is still another object of this invention to provide a key distribution system and a method of distributing a cipher key between two subsystems, wherein there is no fear that the key is breakable by a user's conspiracy attack.

It is yet another object of this invention to provide a key distribution system and a method of distributing a cipher key between two subsystems, which is operable with a high degree of security.

Other objects of this invention will become clear as the description proceeds.

On describing the gist of an aspect of this invention, it will be understood that the key distribution method is for distributing a cipher key between a first subsystem for a first converser and a second subsystem for a second converser via a communication channel by using a public file which stores public information corresponding to identification information assigned to conversers. The first and the second conversers are assigned with first and second identification information, respectively.

The first and the second identification information correspond to first and second public information, respectively. The first and the second subsystems have first and second secret information, respectively.

According to an aspect of this invention, the above-understood key distribution method comprises the following steps: (a) accessing, in the first subsystem, the public file by the second identification information to read the second public information; (b) generating, in the first subsystem, a random number; (c) generating, in the first subsystem, a first cipher key by applying a first predetermined transformation on the second public information and the second identification information on the basis of first and second constants and the random number; (d) generating, in the first subsystem, a key distribution code by applying a second predetermined transformation on the first public information and a third constant on the basis of the first constant, the first secret information, and the random number; (e) transmitting, as distribution information, the key distribution code and the first identification information from the first subsystem to the second subsystem via the communication channel; (f) receiving, in the second subsystem, the distribution information from the first subsystem; and (g) generating, in the second subsystem, a second cipher key by applying a third predetermined transformation on the key distribution code and the first identification information on the basis of the first and the second constants and the second secret information, the second cipher key being equal to the first cipher key.

On describing the gist of another aspect of this invention, it will be understood that the key transmitting subsystem is for use in a key distribution system. The key transmitting subsystem is for transmitting distribution information to a key receiving subsystem of the key distribution system via a communication channel. The key receiving subsystem is for receiving the distribution information to generate a cipher key. The key transmitting subsystem is in use by a transmission converser while the key receiving subsystem is in use by a reception converser. The key distribution system comprises a public file which stores public information corresponding to identification information assigned to conversers. The transmission converser is assigned with transmission identification information corresponding to transmission public information while the reception converser is assigned with reception identification information corresponding to reception public information.

According to another aspect of this invention, the afore-understood key transmitting subsystem comprises: accessing means supplied with the reception identification information and connected to the public file for accessing the public file by the reception identification information to read the reception public information; random number generating means for generating a random number; constant holding means for holding first through third constants; secret information holding means for holding secret information for the transmission converser; public information holding means for holding the transmission public information; identification information holding means for holding the transmission identification information; cipher key generating means connected to the accessing means, the random number generating means, and the constant holding means for generating the cipher key by applying a first predetermined transformation on the reception public information and the reception identification information on the basis of the first and the second constants, and the random number; code generating means connected to the random number generating means, the secret information holding means, the constant holding means, and the public information holding means for generating a key distribution code by applying a second predetermined transformation on the transmission public information and the third constant on the basis of the first constant, the secret information, and the random number; and transmitting means connected to the code generating means and the identification information holding means for transmitting, as the distribution information, the key distribution code and the transmission identification information to the key receiving subsystem via the communication channel.

On describing the gist of still another aspect of this invention, it will be understood that the key receiving subsystem is for use in a key distribution system comprising a key transmitting subsystem for transmitting distribution information to the key receiving subsystem via a communication channel. The key receiving subsystem is for receiving the distribution information to generate a cipher key. The key transmitting subsystem is in use by a transmission converser while the key receiving subsystem is in use by a reception converser. The key distribution system comprises a public file which stores public information corresponding to identification information assigned to conversers. The transmission converser is assigned with transmission identification information corresponding to transmission public information whilst the reception converser is assigned with reception identification information corresponding to reception public information.

According to still another aspect of this invention, the above-understood key receiving subsystem comprises: receiving means connected to the key transmitting subsystem via the communication channel for receiving, as the distribution information, a key distribution code and the transmission identification information from the key transmitting subsystem via the communication channel, the distribution code representing a number generated by using the transmission public information; constant holding means for holding first and second constants; secret information holding means for holding secret information for the second converser; and cipher key generating means connected to the receiving means, the constant information holding means, and the secret information holding means for generating the cipher key by applying a predetermined transformation on the key distribution code and the transmission identification information on the basis of the first and the second constants and the secret information.

DESCRIPTION OF THE PREFERRED EMBODIMENT

Figure 1:
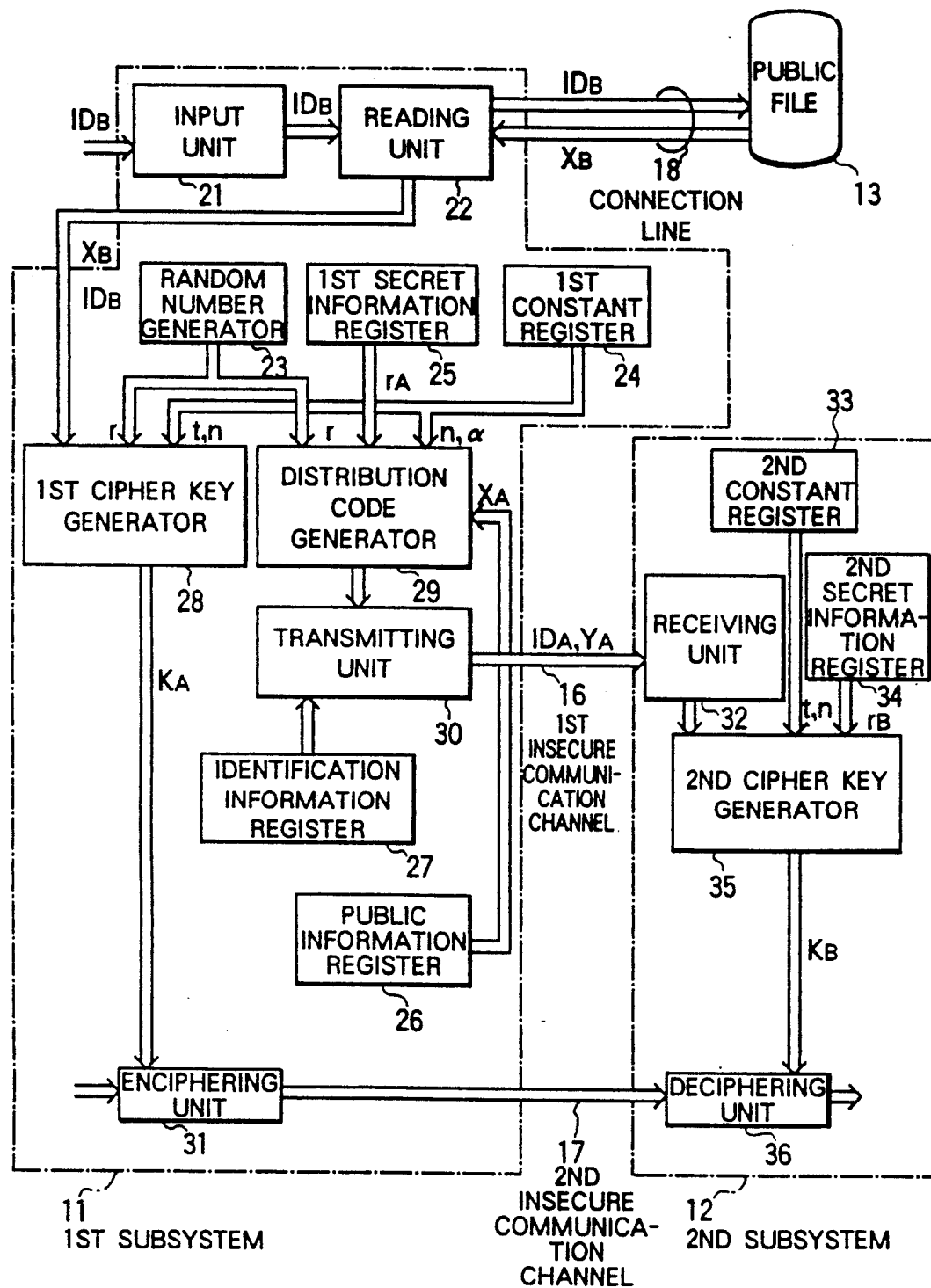
FIG. 1 is a block diagram of a key distribution system according to a preferred embodiment of the instant invention.

Referring to FIG. 1, the description will begin with a key distribution system according to a preferred embodiment of the invention. The key distribution system comprises a first subsystem 11, a second subsystem 12, and a public file 13. The first subsystem 11 and the second subsystem 12 are connected each other via first and second insecure communication channels 16 and 17 each of which may be a telephone line. The first subsystem 11 and the public file 13 are connected to each other via a connection line 18.

In the manner which will later become clear, the first subsystem 11 transmits distribution information to the second subsystem 12 via the first insecure communication channel 16. The second subsystem 12 receives the distribution information to generate a cipher key. Therefore, the first subsystem 11 is called a key transmitting subsystem whilst the second subsystem 12 is referred to a key receiving subsystem. The key transmitting subsystem 11 is in use by a first or transmission converser A while the key receiving subsystem 12 is in use by a second or reception converser B.

The public file 13 stores public information corresponding to identification information assigned to conversers. The transmission converser A is assigned with first or transmission identification information $ID_A$ corresponding to first or transmission public information $X_A$ while the reception converser B is assigned with second or reception identification information $ID_B$ corresponding to second or reception public information $X_B$.

The key transmitting subsystem 11 comprises an input unit 21 and a reading unit 22. The input unit 21 inputs the reception identification information $ID_B$ to provide the reading unit 22 with the reception identification information $ID_B$. The reading unit 22 is connected to the public file 13. Responsive to the reception identification information $ID_B$, the reading unit 22 reads the reception public information $X_B$ out of the public file 13. The reading unit 22 produces the reception identification information $ID_B$ and the reception public information $X_B$. Therefore, a combination of the input unit 21 and the reading unit 22 serves as an accessing arrangement supplied with the reception identification information $ID_B$ and connected to the public file 13 for accessing the public file 13 by the reception identification information $ID_B$ to read the reception public information $X_B$.

The key transmitting subsystem 11 further comprises a random number generator 23, a first constant register 24, a first secret information register 25, a public information register 26, and an identification information register 27. The random number generator 23 generates a random number r. The first constant register 24 holds first through third constants n, t, and α which will later become clear. The first secret information register 25 holds first or transmission secret information $r_A$ for the transmission converser A. The public information register 26 holds the transmission public information $X_A$. The identification information register 27 holds the transmission identification information $ID_A$.

The key transmitting subsystem 11 furthermore comprises a first cipher key generator 28, a distribution code generator 29, a transmitting unit 30, and an enciphering unit 31. The first cipher key generator 28 is connected to the reading unit 22, the random number generator 23, and the constant register 24. In the manner which will later be described, the first cipher key generator 28 generates a first cipher key $K_A$ by applying a first predetermined transformation on the reception public information $X_B$ and the reception identification information $ID_B$ on the basis of the first and the second constants n and t, and the random number r. The distribution code generator 29 is connected to the random number generator 23, the first secret information register 25, the first constant register 24, and the public information register 26. In the manner which will later be described, the distribution code generator 29 generates a key distribution code $Y_A$ by applying a second predetermined transformation on the transmission public information $X_A$ and the third constant α on the basis of the first constant n, the first secret information $r_A$, and the random number r. The transmitting unit 30 is connected to the distribution code generator 29 and the identification information register 27. The transmitting unit 30 transmits, as the distribution information, the key distribution code $Y_A$ and the transmission identification information $ID_A$ to the key receiving subsystem 12 via the first insecure communication channel 16. The enciphering unit 31 is supplied with transmission messages and is connected to the first cipher key generator 28. The enciphering unit 31 enciphers the transmission messages with the first cipher key $K_A$ to produce enciphered messages. The enciphered messages are delivered to the key receiving subsystem 12 via the second insecure communication channel 17.

The key receiving subsystem 12 comprises a receiving unit 32, a second constant register 33, and a second secret information register 34. The receiving unit 32 is connected to the key transmitting subsystem 11 via the first insecure communication channel 16. The receiving unit 32 receives, as the distribution information, the key distribution code $Y_A$ and the transmission identification information $ID_A$ from the key transmitting subsystem 11 via the first insecure communication channel 16. The second constant register 33 holds the first and the second constants n and t. The second secret information register 34 holds second or reception secret information $r_B$ for the second converser B.

The key receiving subsystem 12 further comprises a second cipher key generator 35 and a deciphering unit 36. The second cipher key generator 35 is connected to the receiving unit 32, the first constant register 33, and the second secret information register 34. The second cipher key generator 35 generates a second cipher key $K_B$ by applying a third predetermined transformation on the key distribution code $Y_A$ and the transmission identification information $ID_A$ on the basis of the first and the second constants n and t and the second secret information $r_B$. In the manner which will later become clear, the second cipher key $K_B$ coincides with the first cipher key $K_A$. The deciphering unit 36 is supplied with the enciphered messages via the second insecure communication channel 17 and is connected to the second cipher key generator 35. The deciphering unit 36 deciphers the enciphered messages with the second cipher key $K_B$ to produce reception messages which coincide with the transmission messages.

Figure 2:
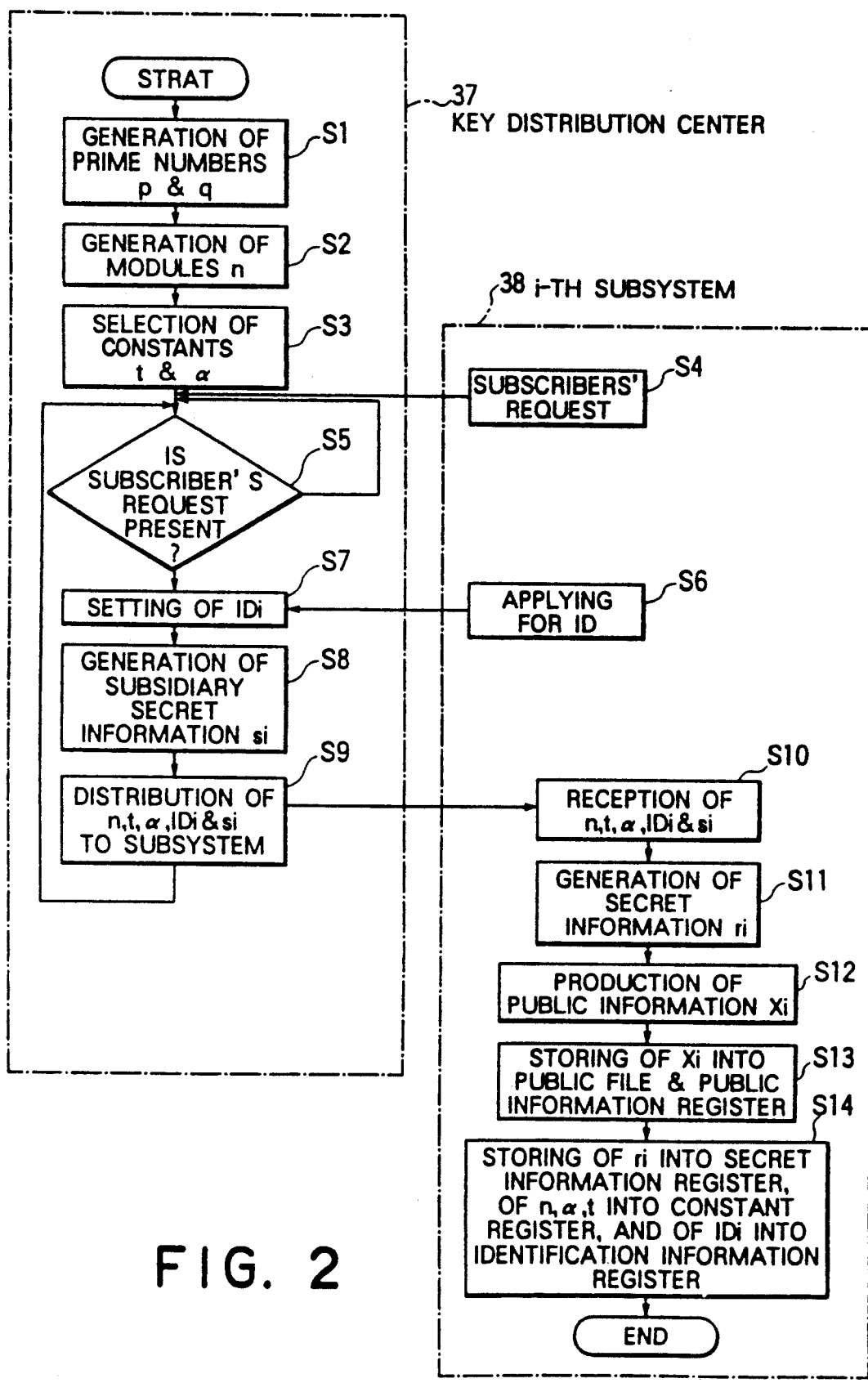
FIG. 2 shows a flow chart for use in describing the operation of issuing various information used in the key distribution system illustrated in FIG. 1.

Referring to FIG. 2, description will be made as regards operation of issuing the first through the third constants n, t, and α, an i-th identification information $ID_i$, an i-th subsidiary secret information $s_i$, an i-th secret information $r_i$, and an i-th public information $X_i$, where i represents a positive integer. In the example being illustrated, the positive integer i is one selected from one and two. In the manner which will later be described, a key distribution center 37 distributes the first through the third constants n, t, and α, the i-th identification information $ID_i$, and the i-th subsidiary secret information $s_i$ to an i-th subsystem 38, like the first and the second subsystems 11 and 12 in FIG. 1.

At first, the key distribution center 37 generates two sufficiently large prime numbers p and q (a step S1) and then calculates the first constant, i.e. a module n which is a product of the two prime numbers p and q (a step S2). For instance, the two prime numbers p and q may be of size at least 256 bits. The second constant t is selected as an exponent such that exd=1 (mod $(p-1)\times(q-1)$) and the third constant $\alpha$ is selected as a positive integer which is both a primitive element in finite fields GP(p) and GP(q) (a step S3). The third constant $\alpha$ is less than the first constant n.

The i-th subsystem 38 issues a subscriber's request to the key distribution center 37 (a step S4). The i-th subsystem 38 judges whether the subscriber's request is present or absent (a step S5). The i-th subsystem 38 applies for the i-th identification information $ID_i$ therefor (a step S6). When the subscriber's request is present (YES of the step S5), the key distribution center 37 sets the i-th identification information $ID_i$ on applying for the i-th identification information $ID_i$ (a step S7). At a step S8, the key distribution center 37 calculates the i-th subsidiary secret information $s_i$ on the i-th identification information $ID_i$ by using the first and the second constants n and t as follows:

$$s_i = (ID_i)^{-(1/t)} (\bmod\ n). \qquad (1)$$

That is, the first and the second identification information $ID_A$ and $ID_B$ are related to first and second subsidiary secret information $s_A$ and $s_B$ by using the first and the second constants n and t as follows:

$$s_A = (ID_A)^{-(1/t)} (\bmod\ n); \qquad (2)$$

and $$s_B = (ID_B)^{-(1/t)} (\bmod\ n). \qquad (3)$$

Subsequently, the key distribution center 37 secretly distributes the first through the third constants n, t, and $\alpha$, the i-th identification information $ID_i$, and the i-th subsidiary secret information $s_i$ to the i-th subsystem 38 (a step S9). The i-th subsystem 38 receives the first through the third constants n, t; and $\alpha$, the i-th identification information $ID_i$, and the i-th subsidiary secret information $s_i$ from the key distribution center 37 (a step S10). The i-th subsystem 38 generates a random number as the i-th secret information $r_i$ (a step S11). Therefore, the first and the second conversers A and B have the first and the second secret information $r_A$ and $r_B$, respectively. At a step S12, the i-th subsystem 38 calculates the i-th public information $X_i$ on the i-th subsidiary secret information $s_i$ and the third constant $\alpha$ by using the first constant n and the i-th secret information $r_i$ as follows:

$$X_i = s_i \times \alpha^{r_i} (\bmod\ n). \qquad (4)$$

That is, the first and the second public information $X_A$ and $X_B$ are represented by using the first and the second subsidiary secret information $s_A$ and $s_B$, the first and the third constants n and $\alpha$, and the first and the second secret information $r_A$ and $r_B$ as follows:

$$X_A = s_A \times \alpha^{r_A} (\bmod\ n); \qquad (5)$$

and $$X_B = s_B \times \alpha^{r_B} (\bmod\ n). \qquad (6)$$

At a step S13, the i-th public information $X_i$ is stored into the public file 13 (FIG. 1) on a designated address which coincides with the i-th identification information $ID_i$ and into an i-th public information register, like the public information register 26 (FIG. 1). Subsequently, the i-th subsystem 38 stores the i-th secret information $r_i$ into an i-th secret information register, like 25 and 34 in FIG. 1, stores the first through the third constants n, t, and $\alpha$ into an i-th constant register, like 24 and 33 in FIG. 33, and stores the i-th identification information $ID_i$ into an i-th identification information register, like 27 in FIG. 1 (a step S14). The i-th identification information $ID_i$ represents herein a number obtained by considering as a numeric value a code obtained by encoding the address, the name and so on of the i-th converser.

Turning to FIG. 1, description will be made as regards operation of the key distribution system. It will be assumed that the first (key transmitting) subsystem 11 of the first (transmission) converser A accesses the public file 13.

In the first subsystem 11, the reception identification information $ID_B$ is supplied to the reading unit 22 through the input unit 21. The reading unit 22 accesses the public file 13 by the reception identification information $ID_B$ to read the reception public information $X_B$. The reception public information $X_B$ and the reception identification information $ID_B$ are supplied from the reading unit 22 to the first cipher key generator 28. The first cipher key generator 28 is also supplied with the random number r generated by the random number generator 23 and with the first and the second constants n and t which are held in the first constant register 24. The first cipher key generator 28 generates the first cipher key $K_A$ by applying the first predetermined transformation on the reception public information $X_B$ and the reception identification information $ID_B$ on the basis of the first and the second constants n and t, and the random number r. The first predetermined transformation is represented by:

$$K_A = (X_B^t \times ID_B)^r (\bmod\ n). \qquad (7)$$

Incidentally, the following relationship is satisfied. That is:

$$X_B^t = s_B^t \times \alpha^{rBxt} = (ID_B)^{-1} \times \alpha^{rBxt}. \qquad (8)$$

To substitute the equation (8) into the equation (7), the first cipher key $K_A$ is represented by using the third constant $\alpha$, the second secret information $r_B$, the random number r, and the second constant t as follows:

$$K_A = \alpha^{rBxrxt}. \qquad (9)$$

The random number r is also supplied to the distribution code generator 29. The distribution code generator 29 is supplied with the first secret information $r_A$ from the first secret information register 25, with the first and the third constants n and $\alpha$ from the first constant register 24, and with the transmission public information $X_A$ from the public information register 26. The distribution code generator 29 generates, as an intermediate cipher key, the key distribution code $Y_A$ by applying the second predetermined transformation on the transmission public information $X_A$ and the third constant $\alpha$ on the basis of the first constant n, the first secret information $r_A$, and the random number r. The second predetermined transformation is represented by:

$$Y_A = X_A \times \alpha^{r-r_A} (mod\ n).  \quad (10)$$

The key distribution code $Y_A$ is supplied to the transmitting unit 30. The transmitting unit 30 is also supplied with the transmission identification information $ID_A$ held in the identification information register 27. The transmitting unit 30 transmits, as the distribution information, the key distribution code $Y_A$ and the transmission identification information $ID_A$ to the key receiving subsystem 12 via the first insecure communication channel 16.

In the key receiving subsystem 12, the receiving unit 32 receives, as the distribution information, the key distribution code $Y_A$ and the transmission identification information $ID_A$ from the key transmitting subsystem 11 via the first insecure communication channel 16. The key distribution code $Y_A$ and the transmission identification information $ID_A$ are supplied to the second cipher key generator 35 from the receiving unit 32. The second cipher key generator 35 is also supplied with the first and the second constants n and t held in the second constant register 33 and with the second secret information $r_B$ held in the second secret information register 34. The second cipher key generator 35 generates the second cipher key $K_B$ by applying the third predetermined transformation on the key distribution code $Y_A$ and the transmission identification information $ID_A$ on the basis of the first and the second constants n and t and the second secret information $r_B$. The third predetermined transformation is represented by:

$$K_B = (Y_A{}^t \times ID_A)^{r_B} (mod\ n). \quad (11)$$

Incidentally, the following relationship is satisfied. That is:

$$Y_A{}^t = s_A{}^t \times \alpha^{rxt} = (ID_A)^{-1} \times \alpha^{rxt}. \quad (12)$$

To substitute the equation (12) into the equation (11), the second cipher key $K_B$ is represented by using the third constant $\alpha$, the second secret information $r_B$, the random number r, and the second constant t as follows:

$$K_B = \alpha^{r_B \times r \times t}  \quad (13)$$

As apparent from the two equations (9) and (13), the second cipher key $K_B$ coincides with the first cipher key $K_A$. As a result, it is unnecessary for the second (key receiving) subsystem 12 to send distribution information to the first (key transmitting) subsystem 11. This is because the second or reception public information $X_B$ for the second or reception converser B is stored in the public file 13 and the first subsystem 11 can access the public file 13 by the second or reception identification information $ID_B$ to read the reception public information $X_B$. Accordingly, the first subsystem 11 for the first converser A can distribute the cipher key to the second subsystem 12 for the second converser B in spite of presence or absence of the second converser B. In addition, the first subsystem 11 can transmit, to the second subsystem 12, the enciphered messages as well as the key distribution code $Y_A$ and the transmission identification information $ID_A$.

Furthermore, an i-th converser assigned with the i-th identification information $ID_i$, in general, has the i-th secret information $r_i$ which is held in the secret information register, like 25 and 34 in FIG. 1 and which is used as secret information for transmission and secret information for reception in common. As a result, it is possible to easily manage the secret information.

In order to impersonate the i-th converser by tampering with the i-th public information $X_i$, an eavesdropper must find the i-th public information $X_i$ and the i-th secret information $r_i$ which satisfy the following relationship:

$$X_i{}^t \times ID_i = \alpha^{txr_i} (mod\ n). \quad (14)$$

However, it is difficult for the eavesdropper to find the i-th public information $X_i$ and the i-th secret information $r_i$ by a converser's conspiracy attack. This reason will be described more in detail in a reference, for example, an article contributed by Eiji Okamoto to "Advances in Cryptology-CRIPTO '87", pages 194-202, under the title of "Key Distribution Systems Based on Identification Information". This reference describes that the subsidiary secret information $s_i$ and the i-th secret information $r_i$ are not revealed although the i-th public information $X_i$ is opened to the public.

Figure 3:
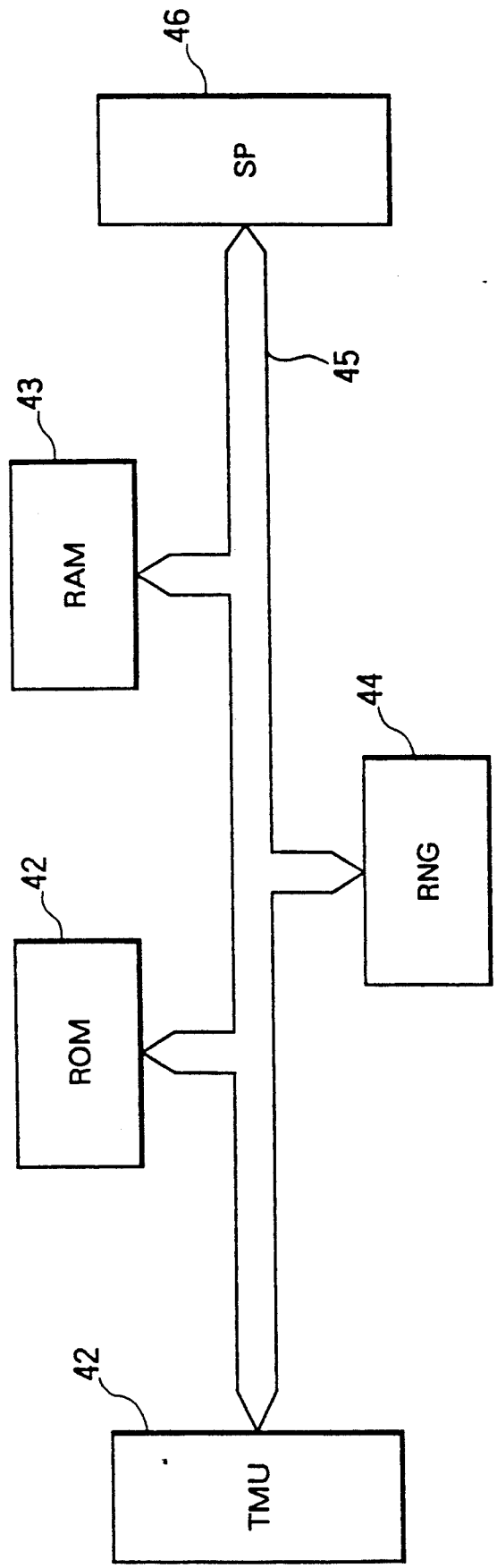
FIG. 3 is a block diagram of a subsystem used as the first and the second subsystems in FIG. 1.

Referring now to FIG. 3, description will be made as regards a subsystem, like the first and the second subsystems 11 and 12 in FIG. 1. The subsystem comprises a terminal unit (TMU) 41, a read only memory unit (ROM) 42, a random access memory unit (RAM) 43, a random number generator (RNG) 44, a common bus 45, and a signal processor (SP) 46. The terminal unit 41 may be a personal computer equipped with communication processing functions. The common bus 45 interconnects the terminal unit 41, the read only memory unit 42, the random access memory unit 43, the random number generator 44, and the signal processor 46.

The random number generator 44 may be the key source disclosed in U.S. Pat. No. 4,200,770 issued to Hellman et al. The signal processor 46 may be a processor available from CYLINK Corporation under the trade name CY 1024 KEY MANAGEMENT PROCESSOR.

The random number generator 44 generates the random number r in response to a command given from the signal processor 46. Therefore, the random number generator 44 acts in cooperation with the signal processor 46 as the random number generator 23 in FIG. 1. The read only memory unit 42 stores the first through the third constants n, t, and $\alpha$, the i-th subsidiary secret information $s_i$, the i-th secret information $r_i$, and the i-th identification information $ID_i$. The read only memory unit 42 is therefore operable as the constant register, like 24 or 33 in FIG. 1, the secret information register, like 25 or 34 in FIG. 1, and the identification information register, like 27 in FIG. 1. Instead of storing the i-th secret information $r_i$ into the read only memory unit 42, the i-th secret information $r_i$ may be stored in the random access memory unit 43 from the terminal unit 41 everytime conversers or users communicate. The random access memory unit 43 stores the i-th public information $X_i$. Therefore, the random access memory unit 43 acts as the public information register 26 in FIG. 1.

The read only memory unit 42 also stores a program which is divisible into a first subprogram for transmission and a second subprogram for reception. The random access memory unit 43 is used to temporarily store intermediate calculation results. According to the first subprogram stored in the read only memory unit 42, the signal processor 46 serves in cooperation with the random access memory unit 43 as the first cipher key generator 28 and the distribution code generator 29 in FIG. 1. According to the second subprogram stored in the read only memory unit 42, the signal processor 46 acts in cooperation with the random access memory unit 43 as the second cipher key generator 35 in FIG. 1. The terminal unit 41 is operable as either the transmitting unit 30 in FIG. 1 or the receiving unit 32 in FIG. 1.

Each of the first and the second subsystems 11 and 12 may be a data processing unit such as a general purpose computer and an integrated circuit (IC) card.

What is claimed is:

1. A method of distributing a cipher key between a first subsystem for a first converser and a second subsystem for a second converser via a communication channel by using a public file which stores public information corresponding to identification information assigned to conversers, said first and said second conversers being assigned with first and second identification information, respectively, said first and said second identification information corresponding to first and second public information, respectively, said first and said second subsystems having first and second secret information, respectively, said method comprising the following steps:

(a) accessing, in said first subsystems, said public file by said second identification information to read said second public information;

(b) generating, in said first subsystem, a random number;

(c) generating, in said first subsystem, a first cipher key by applying a first predetermined transformation on said second public information and said second identification information on the basis of first and second constants and said random number;

(d) generating, in said first subsystem, a key distribution code by applying a second predetermined transformation on said first public information and a third constant on the basis of said first constant, said first secret information, and said random number;

(e) transmitting, as distribution information, said key distribution code and said first identification information from said first subsystem to said second subsystem via said communication channel;

(f) receiving, in aid second subsystem, said distribution information from said first subsystem; and (g) generating, in said second subsystem, a second cipher key by applying a third predetermined transformation on said key distribution code and said first identification information on the said of said first and said second constants and said second secret information, said cipher key being equal to said first cipher key;

wherein r is said random number, n, t, and $\alpha$ are said first, said second, and said third constants, $ID_A$ and $ID_B$ are said first an said second identification information, $X_A$ and $X_B$ are said first and said second public information, $r_A$ and $r_B$ are said first and said second secret information, $K_A$ and $K_B$ are said first and said second cipher keys, $Y_A$ is said key distribution code, said first predetermined transformation being represented by $$K_A = (X_B{}^t \times ID_B)^r \pmod{n};$$

said second predetermined transformation being represented by $$Y_A = X_Z \times \alpha^{r-r_A} \pmod{n};$$

and said third predetermined transformation being represented by $$K_B = (Y_A{}^t \times ID_A)^{r_B} \pmod{n}.$$

2. A key distribution method as claimed in claim 1, wherein said first and said second identification information $ID_A$ and $ID_B$ are related to first and second subsidiary secret information $s_A$ and $s_B$ by using said first and said second constants n and t as follows:

$$s_A = (ID_A)^{-(1/t)} \pmod{n};$$

and $$s_B = (ID_B)^{-(1/t)} \pmod{n};$$

and said first an said second public information $X_A$ and $X_B$ are represented by using said first and said second subsidiary secret information $s_A$ and $s_B$, said first and said third constants n and $\alpha$, and said first and said second secret information $r_A$ and $r_B$ as follows:

$$X_A = s_A \times \alpha^{r_A} \pmod{n};$$

$$X_B = s_B \times \alpha^{r_B} \pmod{n}.$$

3. A key transmitting subsystem for use in a key distribution system, said key transmitting subsystem being for transmitting distribution information to a key receiving subsystem of said key distribution system via a communication channel, said key receiving subsystem being for receiving said distribution information to generate a cipher key, said key transmitting subsystem being in use by a transmission converser while said key receiving subsystem is in use by a reception converser, said key distribution system comprising a public file which stores public information corresponding to identification information assigned to conversers, said transmission converser being assigned with transmission identification information corresponding to transmission public information while said reception converser is assigned with reception identification information corresponding to reception public information, said key transmitting subsystem comprising:

accessing means supplied with said reception identification information and connected to said public file for accessing said public file by said reception identification information to read said reception public information;

random number generating means for generating a random number;

constant holding means for holding first through third constants;

secret information holding means for holding secret information for said transmission converser;

public information holding means for holding said transmission public information;

identification information holding means for holding said transmission identification information;

cipher key generating means connected to said accessing means, said random number generating means, and said constant holding means for generating said cipher key by applying a first predetermined transformation on said reception information and said reception identification information on the basis of said first and said second constants, and said random number;

code generating means connected to said random number generating means, said secret information holding means, said constant holding means, and said public information holding means for generating a key distribution code by applying a second predetermined transformation on said transmission public information and said third constant on the basis of said first constant, said secret information, and said random number; and transmitting means connected to said code generating means and said identification information holding means for transmitting, as said distributing information, said key distribution code and said transmission identification information to said key receiving subsystem via said communication channel;

wherein r is said random number, n, t, and $\alpha$ are said first, said second, and said third constants, $ID_A$ and $ID_B$ are said transmission and said reception identification information $X_A$ and $X_B$ are said transmission and said reception public information, $r_A$ is said secret information, $K_A$ is said cipher key, $Y_A$ is said key distribution code, said first predetermined transformation being represented by $$K_A = (X_B{}^r \times ID_B)^r \pmod{n};$$

and said second predetermined transformation being represented by $$Y_A = X_A \times \alpha^{r - r_A} \pmod{n}.$$

4. A key receiving subsystem for use in a key distributing system comprising a key transmitting subsystem for transmitting distribution information to said key receiving subsystem via a communication channel, said key receiving subsystem being for receiving said distribution information to generate a cipher key, said key transmitting subsystem being in use by a transmission converser while said key receiving subsystem is in use by a reception converser, said key distribution system comprising a public file which stores public information corresponding to identification information assigned to conversers, said transmission converser being assigned with transmission identification information corresponding to transmission public information while said reception converser is assigned with reception identification information corresponding to reception public information, said key receiving subsystem comprising:

receiving means connected to said key transmitting subsystem via said communication channel for receiving, as said distribution information, a key distribution code and said transmission identification information from said key transmitting subsystem via said communication channel, said distribution code representing a number generated by using said transmission public information;

constant holding means for holding first and second constants;

secret information holding means for holding secret information for said reception converser; and cipher key generating means connected to said receiving means, said constant information holding means, and said secret information holding mean for generating said cipher key by applying a predetermined transformation on said key distribution code and said transmission identification information on the basis of said first and said second constants and said secret information;

wherein n and t are said first and said second constants, $ID_A$ is said transmission identification information, $r_B$ is said secret information, $Y_A$ is said key distribution code, $K_B$ is said cipher key, and said predetermined transformation is represented by $$K_B = (Y_A{}^t \times ID_A)^{r_B} \pmod{n}.$$

* * * * *